(12) United States Patent
Miyabe et al.

(10) Patent No.: US 9,393,827 B2
(45) Date of Patent: Jul. 19, 2016

(54) RECORDING MEDIUM

(71) Applicant: CANON KABUSHIKI KAISHA, Tokyo (JP)

(72) Inventors: Masahito Miyabe, Yokohama (JP); Hisao Kamo, Ushiku (JP); Isamu Oguri, Yokohama (JP); Olivia Herlambang, Kawasaki (JP); Naoya Hatta, Kawasaki (JP); Shinya Yumoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/591,728

(22) Filed: Jan. 7, 2015

(65) Prior Publication Data

US 2015/0197114 A1    Jul. 16, 2015

(30) Foreign Application Priority Data

Jan. 10, 2014  (JP) ................................. 2014-003144

(51) Int. Cl.
| | | |
|---|---|---|
| *B41M 5/00* | (2006.01) | |
| *B41M 5/52* | (2006.01) | |
| *C01B 33/141* | (2006.01) | |
| *C08K 5/5419* | (2006.01) | |
| *C08K 9/06* | (2006.01) | |
| *C08K 5/5455* | (2006.01) | |

(52) U.S. Cl.
CPC ............. *B41M 5/5218* (2013.01); *B41M 5/529* (2013.01); *B41M 5/5227* (2013.01); *B41M 5/5254* (2013.01); *C01B 33/141* (2013.01); *C08K 5/5419* (2013.01); *C08K 5/5455* (2013.01); *C08K 9/06* (2013.01)

(58) Field of Classification Search
CPC .... B41M 5/52; B41M 5/5218; B41M 5/5227; B41M 5/529
See application file for complete search history.

(56) References Cited

U.S. PATENT DOCUMENTS

| | | | |
|---|---|---|---|
| 2004/0080606 A1* | 4/2004 | Ishida | ...................... B41J 2/325 347/213 |
| 2006/0013971 A1 | 1/2006 | Chen | |
| 2013/0040078 A1 | 2/2013 | Scharfe | |

FOREIGN PATENT DOCUMENTS

| | | |
|---|---|---|
| EP | 1306395 A2 | 5/2003 |
| JP | 2006-231786 A | 9/2006 |
| JP | 2006-232586 A | 9/2006 |
| JP | 2007-245713 A | 9/2007 |
| WO | 2008/041342 A1 | 4/2008 |

* cited by examiner

*Primary Examiner* — Betelhem Shewareged

(74) *Attorney, Agent, or Firm* — Canon U.S.A. Inc., IP Division

(57) ABSTRACT

A recording medium that includes a base material and an ink-receiving layer. The ink-receiving layer includes an inorganic particle including a structure represented by General Formula (1) and a structure represented by General Formula (2) and a binder.

7 Claims, No Drawings

RECORDING MEDIUM

BACKGROUND OF THE INVENTION

1. Field of the Invention

The present invention relates to a recording medium.

2. Description of the Related Art

A recording medium that includes an ink-receiving layer that contains inorganic particles has been used because it has good ink absorbency and allows an image having high color developability to be formed. Generally, the recording medium that includes an ink-receiving layer that contains inorganic particles is prepared by applying an ink-receiving layer coating liquid that contains the inorganic particles to a base material and subsequently drying the resulting coating film. However, there has been a technical problem with the above-described method where cracking may occur in the ink-receiving layer while the ink-receiving layer is drying.

In order to reduce occurrence of cracking in the ink-receiving layer, hitherto, there have been proposed methods (e.g., Japanese Patent Laid-Open Nos. 2006-232586 and 2007-245713, hereinafter referred to as "PTL 1" and "PTL 2", respectively) in which a specific material is used for preparing the ink-receiving layer coating liquid or the pH of the ink-receiving layer coating liquid is controlled to a specific value. In PTL 1, it is described that controlling the pH of a coating liquid that includes fumed silica reduces the viscosity of the coating liquid, which reduces occurrence of cracking in the ink-receiving layer. In PTL 2, it is described that use of a coating liquid that includes inorganic particles, a silane coupling agent, and at least one substance selected from the group consisting of a basic inorganic salt and ammonia and that has a pH of 5.0 or less reduces occurrence of cracking in the ink-receiving layer. In PTL 2, it is also described that the silane coupling agent is adsorbed onto the surfaces of the inorganic particles.

However, a recording medium that includes an ink-receiving layer that contains inorganic particles modified with a silane coupling agent as in PTL 2 is known in the related art. In Japanese Patent Laid-Open No. 2006-231786 (hereinafter, referred to as "PTL 3"), a recording medium that includes an ink-receiving layer that contains inorganic particles that are surface-modified with a silane coupling agent having a reactive substituent and inorganic particles that are surface-modified with another silane coupling agent having a functional group that reacts with the reactive substituent is described. In PTL 3, it is described that this recording medium has good ink absorbency and high surface strength and allows an image having high color developability to be formed. The silane coupling agents described in PTLs 2 and 3 do not include hydroxyl groups.

SUMMARY OF THE INVENTION

According to one aspect of the present invention, there is provided a recording medium including: a base material; and an ink-receiving layer including an inorganic particle including a structure represented by General Formula (1) below, and a structure represented by General Formula (2) below, and a binder.

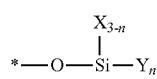

(1)

The structure represented by General Formula (1) is bonded to a surface of the inorganic particle at a position marked with *. In General Formula (1), X represents any one of an alkoxy group having 1 to 8 carbon atoms, an aryloxy group, an acetoxy group, a halogen atom, a hydrogen atom, a hydrocarbon group having 1 to 8 carbon atoms, and —O—*; Y represents a structure including a primary hydroxyl group; and n is 1, 2, or 3.

(2)

The structure represented by General Formula (2) is bonded to the surface of the inorganic particle at a position marked with *. In General Formula (2), X' represents any one of an alkoxy group having 1 to 8 carbon atoms, an aryloxy group, an acetoxy group, a halogen atom, a hydrogen atom, a hydrocarbon group having 1 to 8 carbon atoms, and —O—*; Y' represents a structure including a cationic group; and m is 1, 2, or 3.

Further features of the present invention will become apparent from the following description of exemplary embodiments.

DESCRIPTION OF THE EMBODIMENTS

According to the studies conducted by the inventors of the present invention, in the recording media prepared by the methods described in PTLs 1 and 2, occurrence of cracking in the ink-receiving layer was reduced, but not to a level desired in the present invention. In the recording medium described in PTL 3, cracking also occurred in the ink-receiving layer. In all of the above recording media, cracking occurred in the ink-receiving layer especially in the case where, subsequent to application of the coating liquid, the resulting coating film was rapidly dried with hot air of 90° C. or more.

Accordingly, the present invention is directed to providing a recording medium that allows occurrence of cracking in the ink-receiving layer to be reduced.

Hereinafter, a preferred embodiment of the present invention is described in detail below.

According to the studies conducted by the inventors of the present invention, it is considered that cracking in an ink-receiving layer is caused due to weak interaction between inorganic particles and a binder. Thus, in order to increase the interaction between inorganic particles and a binder, the inventors devised the use of inorganic particles having a structure including a primary hydroxyl group that strongly interact with a binder. The inventors have conducted further studies and, as a result, found that the interaction between the structure including a primary hydroxyl group (structure represented by General Formula (1) shown below) and a binder may be produced in a more efficient manner when the inorganic particles have a structure including a cationic group in addition to the structure including a primary hydroxyl group, that is, by using inorganic particles having a structure represented by General Formula (1) and a structure represented by General Formula (2) shown below. It is considered that occurrence of cracking in the ink-receiving layer is reduced by increasing the interaction between inorganic particles and a binder in this manner. However, it is considered that, even when the surfaces of inorganic particles are modified with a silane coupling agent that does not include hydroxyl groups as in PTLs 2 and 3, interaction between such inorganic particles and a binder is weak and occurrence of cracking in the ink-receiving layer is not reduced to a sufficient degree.

Recording Medium

The recording medium according to an embodiment of the present invention includes a base material and an ink-receiving layer. The recording medium according to the embodiment may be used as an ink-jet recording medium in an ink-jet recording method. Components of the recording medium according to the embodiment are described below.

Base Material

The base material may be composed of only base paper. Alternatively, the base material may include base paper and a resin layer, that is, a base paper coated with a resin. In this embodiment, a base material that includes base paper and a resin layer is preferably used. In such a case, the resin layer may be formed on only one surface of the base paper or on both surfaces of the base paper.

Base Paper

The base paper is mainly made of wood pulp. As needed, synthetic pulp such as polypropylene and synthetic fibers such as nylon and polyester may be used as materials for making the base paper. Examples of the wood pulp include bleached hardwood kraft pulp (LBKP), bleached hardwood sulfite pulp (LBSP), bleached softwood kraft pulp (NBKP), bleached softwood sulfite pulp (NBSP), hardwood dissolving pulp (LDP), softwood dissolving pulp (NDP), unbleached hardwood kraft pulp (LUKP), and unbleached softwood kraft pulp (NUKP). These wood pulps may be used alone or in combination of two or more. Among these wood pulps, LBKP, NBSP, LBSP, NDP, and LDP that include a relatively large amount of short-fiber component are preferably used. As pulp, a chemical pulp (sulfate pulp or sulfite pulp) that does not contain a large amount of impurities may be used. A pulp that has been bleached in order to enhance brightness may also be used. As needed, a sizing agent, a white pigment, a paper-strength additive, a fluorescent brightening agent, a water-retaining agent, a dispersant, and a softening agent may be added to the base paper.

In this embodiment, the thickness of the base paper is preferably 50 μm or more and 130 μm or less and is more preferably 90 μm or more and 120 μm or less. In this embodiment, the thickness of the base paper is determined in the following manner. The recording medium is cut with a microtome to expose its cross section, and the cross section is observed using a scanning electron microscope. The thickness of the base paper is measured at 100 or more randomly chosen positions, and the average of the measured values is considered to be the thickness of the base paper. In this embodiment, the thicknesses of the other layers are also determined in the above-described manner.

In this embodiment, the paper density of the base paper defined by JIS P 8118 is preferably 0.6 g/cm$^3$ or more and 1.2 g/cm$^3$ or less and is more preferably 0.7 g/cm$^3$ or more and 1.2 g/cm$^3$ or less.

Resin Layer

In this embodiment, in the case where the base paper is covered with a resin, it is desirable only that the resin layer be arranged so as to cover a portion of the surface of the base paper. However, the coverage of the resin layer (i.e., the ratio of the area of a portion of the surface of the base paper covered with the resin layer to the area of the entire surface of the base paper) is preferably 70% or more, is more preferably 90% or more, and is further preferably 100%, that is, the entire surface of the base paper is covered with the resin layer.

In this embodiment, the thickness of the resin layer is preferably 20 μm or more and 60 μm or less and is more preferably 35 μm or more and 50 μm or less. In the case where the resin layer is formed on both surfaces of the base paper, it is preferable that the thickness of the resin layer formed on each surface of the base paper falls within the above-described range.

The resin constituting the resin layer may be a thermoplastic resin. Examples of the thermoplastic resin include an acrylic resin, an acrylic silicone resin, a polyolefin resin, and a styrene-butadiene copolymer. Among these thermoplastic resins, a polyolefin resin is preferably used. The term "polyolefin resin" used herein refers to a polymer produced using an olefin as a monomer. Specific examples of such a polyolefin resin include a homopolymer and a copolymer of ethylene, propylene, isobutylene, or the like. The above-described polyolefin resins may be used alone or in combination of two or more as needed. Among these polyolefin resins, polyethylene is preferably used. A low-density polyethylene (LDPE) and a high-density polyethylene (HDPE) may be used as polyethylene.

In this embodiment, the resin layer may include, for example, a white pigment, a fluorescent brightening agent, and ultramarine blue in order to control opacity, brightness, and hue. In particular, it is preferable that the resin layer includes a white pigment in order to enhance opacity. Examples of the white pigment include rutile-type titanium oxide and anatase-type titanium oxide. In this embodiment, the content of the white pigment in the resin layer is preferably 3 g/m$^2$ or more and 30 g/m$^2$ or less. In the case where the resin layer is formed on both surfaces of the base paper, it is preferable that the total content of the white pigment in the two resin layers falls within the above-described range. In the resin layer, the content of the white pigment is preferably 25% by mass or less of the content of the resin constituting the resin layer. If this proportion exceeds 25% by mass, the dispersion stability of the white pigment may be degraded.

Ink-Receiving Layer

In this embodiment, the ink-receiving layer includes inorganic particles having a structure represented by General Formula (1) and a structure represented by General Formula (2), and a binder. In this embodiment, the ink-receiving layer may be composed of a single layer or a plurality of sublayers. The ink-receiving layer may be formed on only one surface of the base material or may be formed on both surfaces of the base material. The thickness of the ink-receiving layer is preferably 15 μm or more and 60 μm or less and is more preferably 30 μm or more and 45 μm or less. Materials that may be included in the ink-receiving layer are described below.

Inorganic Particles Having Structure Represented by General Formula (1) and Structure Represented by General Formula (2)

In this embodiment, the ink-receiving layer includes inorganic particles having a structure represented by General Formula (1) and a structure represented by General Formula (2). The term "inorganic particles having a structure represented by General Formula (1) and a structure represented by General Formula (2)" used herein refers to inorganic particles in which the structure represented by General Formula (1) and the structure represented by General Formula (2) are bonded to the same inorganic particle.

Structure Represented by General Formula (1)

(1)

The structure represented by General Formula (1) is bonded to the surface of the inorganic particle at a position marked with *. In General Formula (1), X represents any one of an alkoxy group having 1 to 8 carbon atoms, an aryloxy group, an acetoxy group, a halogen atom, a hydrogen atom, a hydrocarbon group having 1 to 8 carbon atoms, and —O—*.

The expression "X represents —O—*" means that a silicon atom (Si) is bonded to the surface of an inorganic particle via an oxygen atom (O). The inorganic particle to which the structure represented by General Formula (1) is bonded through —O—* may be different from or same as an inorganic particle to which the structure represented by General Formula (1) is bonded at the position marked with * of the General Formula (1). However, it is considered that, generally, the inorganic particle to which the structure represented by General Formula (1) is bonded through —O—* is same as an inorganic particle to which the structure represented by General Formula (1) is bonded at the position marked with * of the General Formula (1) because the inorganic particle is considerably larger than the structure represented by General Formula (1) above. In General Formula (1), Y represents a structure including a primary hydroxyl group and is preferably a structure including two or more hydroxyl groups, at least one of the hydroxyl groups being a primary hydroxyl group; and n is 1, 2, or 3 and preferably 1.

In this embodiment, the chain length L of the structure represented by Y in General Formula (1) may be longer than the chain length L' of the structure represented by Y' in General Formula (2) shown below.

In this embodiment, the structure represented by General Formula (1) may be a structure represented by General Formula (4) below. In other words, the ink-receiving layer may include inorganic particles having the structure represented by General Formula (4) below and the structure represented by General Formula (2).

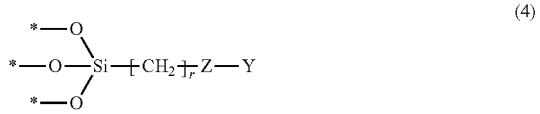
(4)

The structure represented by General Formula (4) is bonded to the surface of an inorganic particle at the positions marked with *. In General Formula (4), Z represents any one of a single bond, an amide group, an ether group, a carbonyl group, and an ester group. The expression "Z represents a single bond" means that the structure represented by Y is directly bonded to the methylene group (—CH$_2$—). In General Formula (4), Y represents a structure including a primary hydroxyl group and is preferably a structure including two or more hydroxyl groups, at least one of the hydroxyl groups being a primary hydroxyl group; and r is an integer of 0 to 5.

In this embodiment, the structure represented by Y in General Formula (1) or (4) may include a structure represented by General Formula (5) below.

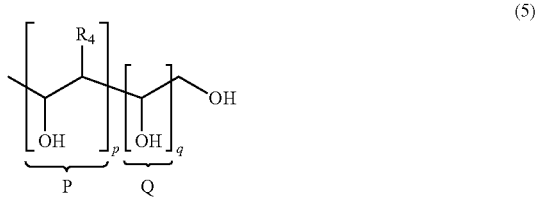
(5)

In General Formula (5), $R_4$ represents a hydrogen atom or a hydrocarbon group having 1 to 8 carbon atoms, and p+q is an integer of 1 or more. The order of the structures P and Q may be random. In other words, General Formula (5) covers not only a case where the structures P and Q are arranged in a manner of -P-P-P-P-Q-Q-, but also cases where the structures P and Q are arranged, for example, in a manner of -Q-Q-Q-P-P-P-, in an alternate manner of -P-Q-P-Q-P-Q-, and in a random manner of -P-P-Q-P-Q-Q-.

Structure Represented by General Formula (2)

(2)

The structure represented by General Formula (2) is bonded to the surface of the inorganic particle at a position marked with *. In General Formula (2), X' represents any one of an alkoxy group having 1 to 8 carbon atoms, an aryloxy group, an acetoxy group, a halogen atom, a hydrogen atom, a hydrocarbon group having 1 to 8 carbon atoms, and —O—*. The expression "X' represents —O—*" means that a silicon atom (Si) is bonded to the surface of an inorganic particle via an oxygen atom (O). The inorganic particle to which the structure represented by General Formula (2) is bonded through —O—* may be different from or same as an inorganic particle to which the structure represented by General Formula (2) is bonded at the position marked with * of the General Formula (2). However, it is considered that, generally, the inorganic particle to which the structure represented by General Formula (2) is bonded through —O—* is same as an inorganic particle to which the structure represented by General Formula (2) is bonded at the position marked with * of the General Formula (2) because the inorganic particle is considerably larger than the structure represented by General Formula (2) above. In General Formula (2), m is 1, 2, or 3 and preferably 1.

In General Formula (2), Y' represents a structure including a cationic group. The cationic group may be a group represented by General Formula (3).

(3)

In General Formula (3), $R_1$, $R_2$, and $R_3$ each independently represent any one of a hydrogen atom, an alkyl group having 1 to 18 carbon atoms, an aryl group, and an aralkyl group.

Compound with which Surfaces of Inorganic Particles are Modified

In this embodiment, the inorganic particles that include the structure represented by General Formula (1) and the structure represented by General Formula (2) may be produced by, for example, modifying the surfaces of inorganic particles with a compound represented by general Formula (6) below and a compound represented by general Formula (7) below.

(6)

In General Formula (6), X represents any one of an alkoxy group having 1 to 8 carbon atoms, an aryloxy group, and an acetoxy group; Y represents a structure including a primary hydroxyl group; and n is 1, 2, or 3.

(7)

In General Formula (7), X' represents any one of an alkoxy group having 1 to 8 carbon atoms, an aryloxy group, and an acetoxy group; Y' represents a structure including a cationic group; and m is 1, 2, or 3.

Inorganic particles have hydroxyl groups on the surfaces thereof, and the compound represented by General Formula (6) and the compound represented by General Formula (7) are reacted with the hydroxyl groups of the surfaces of the inorganic particles. Thus, inorganic particles having the structure represented by General Formula (1) and the structure represented by General Formula (2) are produced.

In this embodiment, the compound represented by General Formula (6) may be at least one compound selected from compounds represented by Structural Formulae A to D below. In Structural Formulae A to D, R represents a hydrogen atom or a hydrocarbon group having 1 to 8 carbon atoms.

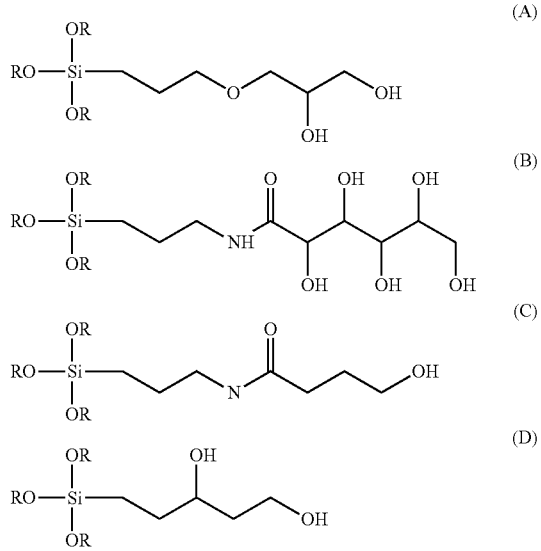

In this embodiment, examples of the compound represented by General Formula (7) include 3-aminopropyltriethoxysilane, 3-aminopropyltrimethoxysilane, 11-aminoundecyltriethoxysilane, 4-aminobutyltriethoxysilane, 3-aminoethylaminopropyltrimethoxysilane, 3-aminoethylaminopropyltriethoxysilane, 3-aminoethylaminoethylaminopropyltrimethoxysilane, 3-aminoethylaminoethylaminopropyltriethoxysilane, bis-(3-trimethoxysilylpropyl)amine, N-phenyl-3-aminopropyltrimethoxysilane, N-(2-aminoethyl-3-aminopropyltrimethoxysilane, and 3-(triethoxysilylpropyl)-diethylenetriamine. Among these compounds, at least one compounds selected from 3-aminopropyltriethoxysilane, 3-aminopropyltrimethoxysilane, and 11-aminoundecyltriethoxysilane is preferably used as the compound represented by General Formula (7).

In this embodiment, in the inorganic particles having the structure represented by General Formula (1) and the structure represented by General Formula (2), the content of the structure represented by General Formula (1) and the structure represented by General Formula (2) is preferably 1% by mass or more and 15% by mass or less and is more preferably 2% by mass or more and 10% by mass or less of the content of the inorganic particles.

Inorganic Particles

Examples of the inorganic particles used in this embodiment include particles of fumed silica, alumina hydrate, fumed alumina, colloidal silica, titanium dioxide, zeolite, kaoline, talc, hydrotalcite, zinc oxide, zinc hydroxide, aluminum silicate, calcium silicate, magnesium silicate, zirconium oxide, and zirconium hydroxide. These inorganic particles may be used alone or in combination of two or more as needed. Among the above-described inorganic particles, particles of fumed silica, alumina hydrate, fumed alumina are preferably used, and fumed silica particles are further preferably used. That is, fumed silica particles having the structure represented by General Formula (1) are further preferably used.

Examples of the fumed silica include AEROSIL series (produced by Evonik Industries) and REOLOSIL QS-type (produced by Tokuyama Corporation).

In this embodiment, the specific surface area of the fumed silica is preferably 50 $m^2/g$ or more and 400 $m^2/g$ or less and is more preferably 200 $m^2/g$ or more and 350 $m^2/g$ or less as measured by a BET method.

In this embodiment, an alumina hydrate represented by General Formula (X) below may be suitably used.

$$Al_2O_{3-n}(OH)_{2n} \cdot mH_2O \qquad \text{General Formula (X):}$$

(where n is 0, 1, 2, or 3; m is 0 or more and 10 or less and is preferably 0 or more and 5 or less; and m and n do not become 0 simultaneously)

The value of m is not always an integer because $mH_2O$ represents an aqueous phase that can be desorbed and is not involved in the formation of a crystal lattice in many cases. The value of m may become zero when alumina hydrate is heated.

In this embodiment, any publicly known method may be employed for producing the alumina hydrate. Specific examples of the publicly known methods include a method in which an aluminum alkoxide is hydrolyzed, a method in which sodium aluminate is hydrolyzed, and a method in which an aqueous sodium aluminate solution is neutralized by adding an aqueous solution of aluminum sulfate or aluminum chloride thereto.

Known crystal structures of alumina hydrate are an amorphous structure, a gibbsite structure, and a boehmite structure, which varies depending on the heat-treatment temperature. The crystal structure of alumina hydrate can be analyzed by X-ray diffractometry. In this embodiment, among the above-described crystal structures, an alumina hydrate having a boehmite structure and an amorphous alumina hydrate are preferably used. Specific examples of such alumina hydrates include alumina hydrates described in, for example, Japanese Patent Laid-Open Nos. 7-232473, 8-132731, 9-66664, 9-76628 and, as commercially available products, Disperal HP14 and HP18 (produced by Sasol Limited). The above-described alumina hydrates may be used alone or in combination of two or more.

In this embodiment, the specific surface area of the alumina hydrate is preferably 100 $m^2/g$ or more and 200 $m^2/g$ or less and is more preferably 125 $m^2/g$ or more and 175 $m^2/g$ or less as measured by a BET method. A BET method is a method in which molecules or ions having known sizes are adsorbed onto the surface of a sample and the specific surface area of the sample is calculated from the amount of the molecules or ions adsorbed. In this embodiment, nitrogen gas is used as a gas that is to be adsorbed onto a sample.

Examples of the fumed alumina include γ-alumina, α-alumina, δ-alumina, θ-alumina, and χ-alumina. Among these fumed aluminas, γ-alumina is preferably used in order to form an image having high optical density and achieve good ink absorbency of the recording medium. Specific examples of the fumed alumina include AEROXIDE; Alu C, Alu 130, Alu 65 (produced by Evonik Industries).

In this embodiment, the specific surface area of the fumed alumina is preferably 50 $m^2/g$ or more and 150 $m^2/g$ or less and is more preferably 80 m²/g or more and 120 m²/g or less as measured by a BET method.

Binder

In this embodiment, the ink-receiving layer includes a binder. The term "binder" used herein refers to a material with which the inorganic particles are bound to one another to form a coating film.

In this embodiment, in the ink-receiving layer, the content of the binder is preferably 50% by mass or less and is more preferably 30% by mass or less of the content of the inorganic particles from the viewpoint of the ink absorbency of the recording medium. From the viewpoint of the binding property of the binder in the ink-receiving layer, this proportion is preferably 5.0% by mass or more and is more preferably 8.0% by mass or more.

Examples of the binder include starch derivatives such as oxidized starch, etherified starch, and phosphorylated starch; cellulose derivatives such as carboxymethyl cellulose and hydroxyethyl cellulose; casein, gelatin, soybean protein, polyvinyl alcohol, and derivatives thereof; conjugated-polymer latexes such as polyvinylpyrrolidone, a maleic anhydride resin, a styrene-butadiene copolymer, and a methyl methacrylate-butadiene copolymer; acrylic-polymer latexes such as an acrylate polymer and a methacrylate polymer; vinyl-polymer latexes such as an ethylene-vinyl acetate copolymer; functional-group-modified polymer latexes produced by modifying the above-described polymers with a monomer containing a functional group such as a carboxyl group; polymers produced by cationizing the above-described polymers with a cationic group; polymers produced by cationizing the surfaces of the above-described polymers with a cationic surfactant; polymers produced by polymerizing monomers constituting the above-described polymers in the presence of cationic polyvinyl alcohol and thereby distributing polyvinyl alcohol over the surfaces of the resulting polymers; polymers produced by polymerizing monomers constituting the above-described polymers in a liquid dispersion in which cationic colloidal particles are suspended and thereby distributing the cationic colloidal particles over the surfaces of the resulting polymers; aqueous binders including a thermosetting synthetic resin such as a melamine resin or a urea resin; polymers and copolymers of an acrylate or a methacrylate, such as polymethyl methacrylate; and synthetic resins such as a polyurethane resin, an unsaturated polyester resin, a vinyl chloride-vinyl acetate copolymer, polyvinyl butyral, and an alkyd resin. These binders may be used alone or in combination of two or more as needed.

Among the above-described binders, polyvinyl alcohol and a polyvinyl alcohol derivative are preferably used. Examples of the polyvinyl alcohol derivative include cation-modified polyvinyl alcohol, anion-modified polyvinyl alcohol, silanol-modified polyvinyl alcohol, and polyvinyl acetal. A polyvinyl alcohol having a primary to tertiary amino group or a quaternary ammonium group in its main chain or side chain as described in Japanese Patent Laid-Open No. 61-10483 is preferably used as the cation-modified polyvinyl alcohol.

The polyvinyl alcohol may be synthesized by, for example, saponifying polyvinyl acetate. The saponification degree of the polyvinyl alcohol is preferably 80 mol % or more and 100 mol % or less and is more preferably 85 mol % or more and 98 mol % or less. The term "saponification degree" used herein refers to the proportion of the number of moles of hydroxyl groups generated by a saponification reaction when polyvinyl acetate is saponified to produce polyvinyl alcohol. In this embodiment, the saponification degree is measured by a method conforming to JIS-K6726. The average polymerization degree of the polyvinyl alcohol is preferably 2,000 or more and is more preferably 2,000 or more and 5,000 or less. In this embodiment, average polymerization degree is viscosity-average polymerization degree measured by a method conforming to JIS-K6726.

In preparation of the ink-receiving layer coating liquid, polyvinyl alcohol or a polyvinyl alcohol derivative may be used in the form of an aqueous solution. In such a case, the solid content of the polyvinyl alcohol or the polyvinyl alcohol derivative in the aqueous solution is preferably 3% by mass or more and 20% by mass or less.

Crosslinking Agent

In this embodiment, the ink-receiving layer may further include a crosslinking agent. Examples of the crosslinking agent include aldehyde compounds, melamine compounds, isocyanate compounds, zirconium compounds, amide compounds, aluminum compounds, boric acids, and borates. These crosslinking agents may be used alone or in combination of two or more as needed. In particular, in the case where polyvinyl alcohol or a polyvinyl alcohol derivative is used as a binder, among the above-described crosslinking agents, boric acids and borates are preferably used.

Examples of the boric acids include orthoboric acid ($H_3BO_3$), metaboric acid, and diboric acid. The borates may be water-soluble salts of the above-described boric acids. Examples of such borates include alkali-metal salts of boric acids, such as a sodium salt and a potassium salt of boric acid; alkaline-earth metal salts of boric acid, such as a magnesium salt and a calcium salt of boric acid; and an ammonium salt of boric acid. Among the above-described boric acids, orthoboric acid is preferably used from the viewpoints of the temporal stability of the coating liquid and the effect of reducing occurrence of cracking.

The amount of the crosslinking agent used may be controlled depending on the manufacture conditions and the like. In this embodiment, in the ink-receiving layer, the content of the crosslinking agent is preferably 1.0% by mass or more and 50% by mass or less and is more preferably 5% by mass or more and 40% by mass or less of the content of the binder.

In the case where the binder is polyvinyl alcohol and the crosslinking agent includes at least one compound selected from boric acids and borates, in the ink-receiving layer, the total content of the boric acids and the borates is preferably 5% by mass or more and 30% by mass or less of the content of the polyvinyl alcohol.

Other Additives

In this embodiment, the ink-receiving layer may include additives other than those described above. Specific examples of the other additives include a pH adjuster, a thickener, a fluidity modifier, an antifoaming agent, a foam inhibitor, a surfactant, a mold-release agent, a penetrant, a coloring pigment, a coloring dye, a fluorescent brightening agent, an ultraviolet absorber, an antioxidant, a preservative, an antifungal agent, a water-resistant additive, a dye fixative, a curing agent, and a weathering material.

Undercoat Layer

In this embodiment, an undercoat layer may be interposed between the base material and the ink-receiving layer in order to increase the adhesion between the base material and the ink-receiving layer. The undercoat layer may include a water-soluble polyester resin, gelatin, polyvinyl alcohol, and the like. The thickness of the undercoat layer is preferably 0.01 µm or more and 5 µm or less.

Backcoat Layer

In this embodiment, in order to enhance ease of handling, suitability for conveyance, and resistance to conveyance abrasion that occurs while printing is continuously performed with a number of recording media being stacked on top of one another, a backcoat layer may be formed on a surface of the base material on the side opposite to the side on which the ink-receiving layer is formed. The backcoat layer may include a white pigment, a binder, and the like. The thickness of the backcoat layer is preferably set so that the dry coating amount is 1 g/m² or more and 25 g/m² or less.

Method for Producing Recording Medium

In this embodiment, a method for producing the recording medium may be, but not particularly limited to, a method that includes preparing an ink-receiving layer coating liquid and applying the ink-receiving layer coating liquid to a base material. The method for producing the recording medium is described below.

Method for Preparing Base Material

In this embodiment, any common papermaking method may be employed for preparing a base paper. Examples of a papermaking apparatus include a Foundrinier paper machine, a cylinder paper machine, a drum paper machine, and a twin-wire paper machine. In order to enhance the flatness and smoothness of the surface of the base paper, the base paper may be subjected to a surface treatment while heating under pressure during or subsequent to the papermaking step. Specific examples of the surface treatment method include calendar processes such as a machine calendar process and a supercalendar process.

Examples of a method for forming a resin layer on the base paper, that is, a method for covering the base paper with a resin, include a melt-extraction method, wet lamination, and dry lamination. In particular, a melt-extraction method, in which one of or both surfaces of the base paper are extrusion-coated with a molten resin, is preferably employed. An example of the melt-extraction method which is widely employed is a method in which the base paper and a resin extruded from an extrusion die are brought into contact with each other at a nipping point between a nip roller and a cooling roller and subsequently pressure-bonded using the nip roller in order to laminate a resin layer on the base paper (also referred to as "extrusion-coating method"). Prior to the formation of the resin layer by a melt-extraction method, the base paper may be subjected to a pretreatment in order to further increase the adhesion between the base paper and the resin layer. Examples of the pretreatment include an acid-etching treatment using a sulfuric acid-chromic acid mixture, a flame treatment using gas flame, an ultraviolet irradiation treatment, a corona discharge treatment, a glow discharge treatment, and an anchor coat treatment with an alkyl titanate or the like. Among these treatments, a corona discharge treatment is preferably performed. In the case where the resin layer includes a white pigment, the base paper may be covered with a mixture of a resin and the white pigment.

Method for Forming Ink-Receiving Layer

In the recording medium according to the embodiment, an ink-receiving layer may be formed on the base material by, for example, the following method. An ink-receiving layer coating liquid is prepared. Subsequently, the coating liquid is applied to the base material, and the resulting coating film is dried. Thus, the recording medium according to the embodiment is formed. The coating liquid may be applied to the base material using a curtain coater, an extrusion coater, or a slide hopper coater. When the coating liquid is applied to the base material, the coating liquid may be heated. The coating film may be dried after the application of the coating liquid by, for example, using a hot-air drying machine such as a linear tunnel dryer, an arch dryer, an air-loop dryer, or a sine-curve air-float dryer or a drying machine in which infrared radiation, a heat dryer, microwave, or the like is used. In this embodiment, occurrence of cracking in the ink-receiving layer may be advantageously reduced even when the coating film is rapidly dried using hot air of 90° C. or more.

EXAMPLES

The above-described embodiment of the present invention is described further in detail with reference to the examples and comparative examples. The embodiment is not limited to the following examples without departing from the scope of the present invention. The "part" in Examples and Comparative Examples are on a mass basis unless otherwise noted.

Example 1

Preparation of Base Material

Paper stock was prepared by mixing 80 parts of LBKP having a Canadian Standard freeness of 450 mLCSF, 20 parts of NBKP having a Canadian Standard freeness of 480 mLCSF, 0.60 parts of cationic starch, 10 parts of heavy calcium carbonate, 15 parts of precipitated calcium carbonate, 0.10 parts of an alkylketene dimer, and 0.030 parts of cationic polyacrylamide and subsequently adding water to the resulting mixture so that the solid content in the mixture was 3.0% by mass. The paper stock was made into paper using a Foundrinier paper machine. The resulting paper was wet-pressed three times and dried using a multi-cylinder dryer. Then, the paper was impregnated with an aqueous oxidized starch solution using a size-press apparatus so that the solid content in the paper became 1.0 g/m² after the paper was dried. The paper was dried and subjected to machine-calendar finishing. Thus, a base paper having a basis weight of 170 g/m², a Stockigt sizing degree of 100 seconds, an air permeability of 50 seconds, a Beck smoothness of 30 seconds, a Gurley stiffness of 11.0 mN, and a thickness of 100 µm was prepared. Subsequently, a resin composition including 70 parts of low-density polyethylene, 20 parts of high-density polyethylene, and 10 parts of titanium oxide was applied onto one surface of the base paper at a dry-coating amount of 25 g/m². Herein, this surface is considered to be the front surface of the base material. Subsequently, low-density polyethylene was applied onto the other surface of the base paper. Thus, a base material was prepared.

Preparation of Fumed Silica Sol A

To 179.97 g of pure water, 1.48 g (3 parts relative to 100 parts of fumed silica on a solid content basis) of an aminosilane coupling agent (3-aminopropyltriethoxysilane, KBE-903, produced by Shin-Etsu Chemical Co., Ltd.), 7.45 g of an 1-M aqueous solution of hydrochloric acid, 11.83 g (5 parts relative to 100 parts of fumed silica on a solid content basis) of a 12.5 mass % aqueous solution of a silane coupling agent represented by Structural Formula A (with R being a hydrogen atom), and 49.28 g of fumed silica (AEROSIL300, produced by Evonik Industries) were added. The resulting mixture was stirred for 30 minutes with a mixer and subsequently further mixed using CLEARMIX at 10,000 rpm for 20 minutes. Thus, a fumed silica sol A (solid content: 20 mass %) including inorganic particles that were fumed silica particles was prepared. The average secondary particle diameter of the fumed silica particles included in the fumed silica sol A was 160 nm.

Preparation of Binder Solution

Polyvinyl alcohol (PVA235, produced by KURARAY Co., Ltd., viscosity-average polymerization degree: 3,500, saponification degree: 88 mol %) was dissolved in ion-exchange water to prepare a binder solution having a solid content of 8.0% by mass.

Preparation of Ink-Receiving Layer Coating Liquid

The fumed silica sol A and the binder solution were mixed together in such a manner that the solid content of polyvinyl alcohol was 23.0 parts relative to 100.0 parts of the solid content of the fumed silica included in the fumed silica sol A to prepare a mixed solution. A crosslinking agent (aqueous solution of orthoboric acid, solid content: 5% by mass) was added to the mixed solution in such a manner that the amount of the crosslinking agent was 17.4 parts relative to 100 parts of polyvinyl alcohol included in the mixed solution on a solid content basis to prepare an ink-receiving layer coating liquid.

Preparation of Recording Medium

The ink-receiving layer coating liquid was heated to 40° C. and then applied to the base material prepared above by slide-die coating so that the resulting coating film had a thickness of 40 μm after being dried. The coating film was dried using hot air of 100° C. having a relative humidity of 10% to prepare a recording medium.

Example 2

A recording medium was prepared as in Example 1, except that the silane coupling agent used in "Preparation of Fumed Silica Sol A" of Example 1 was changed to a silane coupling agent represented by Structural Formula B (with R being an ethyl group).

Example 3

A recording medium was prepared as in Example 1, except that the aminosilane coupling agent used in "Preparation of Fumed Silica Sol A" of Example 1 was changed to 11-aminoundecyltriethoxysilane.

Example 4

A recording medium was prepared as in Example 1, except that the silane coupling agent used in "Preparation of Fumed Silica Sol A" of Example 1 was changed to a silane coupling agent represented by Structural Formula C (with R being a methyl group).

Example 5

A recording medium was prepared as in Example 1, except that the silane coupling agent used in "Preparation of Fumed Silica Sol A" of Example 1 was changed to a silane coupling agent represented by Structural Formula D (with R being a methyl group).

Example 6

A recording medium was prepared as in Example 1, except that the amount of silane coupling agent used in "Preparation of Fumed Silica Sol A" of Example 1 was changed to 3 parts.

Example 7

A recording medium was prepared as in Example 1, except that the amount of silane coupling agent used in "Preparation of Fumed Silica Sol A" of Example 1 was changed to 10 parts.

Example 8

A recording medium was prepared as in Example 1, except that the amount of silane coupling agent used in "Preparation of Fumed Silica Sol A" of Example 1 was changed to 1 part.

Example 9

A recording medium was prepared as in Example 1, except that the amount of silane coupling agent used in "Preparation of Fumed Silica Sol A" of Example 1 was changed to 15 parts.

Example 10

A recording medium was prepared as in Example 1, except that the amount of aminosilane coupling agent used in "Preparation of Fumed Silica Sol A" of Example 1 was changed to 10 parts.

Example 11

A recording medium was prepared as in Example 2, except that the amount of binder solution used in "Preparation of Ink-Receiving Layer Coating Liquid" of Example 2 was changed to 20.0 parts.

Example 12

A recording medium was prepared as in Example 2, except that the amount of binder solution used in "Preparation of Ink-Receiving Layer Coating Liquid" of Example 2 was changed to 25.0 parts.

Example 13

A recording medium was prepared as in Example 2, except that the amount of binder solution used in "Preparation of Ink-Receiving Layer Coating Liquid" of Example 2 was changed to 15.0 parts.

Example 14

A recording medium was prepared as in Example 2, except that the amount of binder solution used in "Preparation of Ink-Receiving Layer Coating Liquid" of Example 2 was changed to 30.0 parts.

Comparative Example 1

A recording medium was prepared as in Example 1, except that the silane coupling agent used in "Preparation of Fumed Silica Sol A" of Example 1 was not used.

Comparative Example 2

A recording medium was prepared as in Example 1, except that the aminosilane coupling agent and the silane coupling agent used in "Preparation of Fumed Silica Sol A" of Example 1 were changed to polydiallyldimethylamine hydrochloride (SHALLOL DC902P, produced by DKS Co. Ltd., solid content: 50 mass %).

Comparative Example 3

A recording medium was prepared as in Example 1, except that the silane coupling agent used in "Preparation of Fumed Silica Sol A" of Example 1 was changed to triethoxymethylsilane.

Comparative Example 4

A recording medium was prepared as in Example 1, except that the aminosilane coupling agent and the silane coupling agent used in "Preparation of Fumed Silica Sol A" of Example 1 were changed to 11-aminoundecyltriethoxysilane and triethoxymethylsilane, respectively.

Table 1 summarizes the compositions of the ink-receiving layer coating liquids used for preparing the recording media described above.

TABLE 1

Compositions of ink-receiving layer coating liquids

| Example No. | Aminosilane coupling agent Type | (Part) | Silane coupling agent Type | (Part) | Polyvinyl alcohol (Part) |
|---|---|---|---|---|---|
| Example 1 | 3-Aminopropyl-triethoxysilane | 3 | Structural Formula A | 5 | 23 |
| Example 2 | 3-Aminopropyl-triethoxysilane | 3 | Structural Formula B | 5 | 23 |
| Example 3 | 11-Aminoundecyl-triethoxysilane | 3 | Structural Formula A | 5 | 23 |
| Example 4 | 3-Aminopropyl-triethoxysilane | 3 | Structural Formula C | 5 | 23 |
| Example 5 | 3-Aminopropyl-triethoxysilane | 3 | Structural Formula D | 5 | 23 |
| Example 6 | 3-Aminopropyl-triethoxysilane | 3 | Structural Formula A | 3 | 23 |
| Example 7 | 3-Aminopropyl-triethoxysilane | 3 | Structural Formula A | 10 | 23 |
| Example 8 | 3-Aminopropyl-triethoxysilane | 3 | Structural Formula A | 1 | 23 |
| Example 9 | 3-Aminopropyl-triethoxysilane | 3 | Structural Formula A | 15 | 23 |
| Example 10 | 3-Aminopropyl-triethoxysilane | 10 | Structural Formula A | 5 | 23 |
| Example 11 | 3-Aminopropyl-triethoxysilane | 3 | Structural Formula B | 5 | 20 |
| Example 12 | 3-Aminopropyl-triethoxysilane | 3 | Structural Formula B | 5 | 25 |
| Example 13 | 3-Aminopropyl-triethoxysilane | 3 | Structural Formula B | 5 | 15 |
| Example 14 | 3-Aminopropyl-triethoxysilane | 3 | Structural Formula B | 5 | 30 |
| Comparative Example 1 | 3-Aminopropyl-triethoxysilane | 3 | — | 0 | 23 |
| Comparative Example 2 | (polydiallyldimethylamine hydrochloride: 3 parts) | | — | 0 | 23 |
| Comparative Example 3 | 3-Aminopropyl-triethoxysilane | 3 | (Triethoxymethyl-silane: 5 parts) | | 23 |
| Comparative Example 4 | 11-Aminoundecyl-triethoxysilane | 3 | (Triethoxymethyl-silane: 5 parts) | | 23 |

(Part): parts by mass relative to 100 parts of fumed silica on a solid content basis Compositions of Ink-Receiving Layer Coating Liquids
Evaluations
Evaluation of Cracking in Ink-Receiving Layer The recording media prepared above were each visually inspected in order to evaluate cracking in the ink-receiving layer in accordance with the following criteria. Table 2 summarizes the evaluation results.

A: Cracks were absent in the ink-receiving layer.
B: A few small cracks were present in the ink-receiving layer.
C: Small cracks were present in the ink-receiving layer, but at a negligible level.
D: Many large cracks were present in the ink-receiving layer.
E: There was a portion in which the ink-receiving layer was curling up and peeled off.

Evaluation of Color Developability of Recorded Image

A 2.5-cm-square black solid image (i.e., image with a recording duty of 100%) was recorded on each of the recording media prepared above using an ink-jet recording apparatus (PIXUS MP990, produced by CANON KABUSHIKI KAISHA) including an ink cartridge (BCI-321, produced by CANON KABUSHIKI KAISHA) in "Glossy Pro, Platinum Grade, No Color Correction" mode at 23° C. and a relative humidity of 50%. The optical density of the recorded image was measured using a reflection densitometer (530 spectrodensitometer, produced by X-Rite, Incorporated). The color developability of the recorded image was evaluated on the basis of the optical density of the recorded image in accordance with the following criteria. The higher the optical density of a recorded image, the higher the color developability of the recorded image. Table 2 summarizes the evaluation results.

A: The optical density of the recorded image was 2.35 or more.
B: The optical density of the recorded image was 2.25 or more and less than 2.35.
C: The optical density of the recorded image was 2.15 or more and less than 2.25.
D: The optical density of the recorded image was 2.05 or more and less than 2.15.
E: The optical density of the recorded image was less than 2.05.

TABLE 2

Evaluation results

| Example No. | Evaluation of cracking in ink-receiving layer | Evaluation of color developability of recorded image |
|---|---|---|
| Example 1 | B | A |
| Example 2 | A | A |
| Example 3 | C | A |
| Example 4 | C | A |
| Example 5 | C | A |
| Example 6 | B | A |
| Example 7 | A | B |
| Example 8 | C | A |
| Example 9 | A | D |
| Example 10 | B | C |
| Example 11 | B | A |
| Example 12 | A | A |
| Example 13 | C | A |
| Example 14 | A | B |
| Comparative Example 1 | E | A |
| Comparative Example 2 | E | A |
| Comparative Example 3 | E | A |
| Comparative Example 4 | E | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-003144 filed Jan. 10, 2014, which is hereby incorporated by reference herein in its entirety.

What is claimed is:

1. A recording medium comprising:
a base material; and
an ink-receiving layer comprising
an inorganic particle including
a structure represented by General Formula (1), and
a structure represented by General Formula (2), and
a binder,

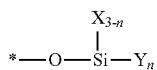
(1)

wherein the structure represented by General Formula (1) is bonded to a surface of the inorganic particle at a position marked with *, and
wherein, in General Formula (1),
X represents any one of an alkoxy group having 1 to 8 carbon atoms, an aryloxy group, an acetoxy group, a halogen atom, a hydrogen atom, a hydrocarbon group having 1 to 8 carbon atoms, and —O-*,
Y represents a structure including a primary hydroxyl group, and
n is 1, 2, or 3,

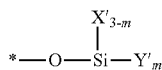
(2)

wherein the structure represented by General Formula (2) is bonded to the surface of the inorganic particle at a position marked with *, and
wherein, in General Formula (2),
X' represents any one of an alkoxy group having 1 to 8 carbon atoms, an aryloxy group, an acetoxy group, a halogen atom, a hydrogen atom, a hydrocarbon group having 1 to 8 carbon atoms, and —O-*,
Y' represents a structure including a cationic group, and
m is 1, 2, or 3.

2. The recording medium according to claim 1,
wherein, in General Formula (2), the cationic group is a structure represented by General Formula (3),

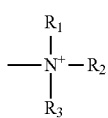
(3)

wherein, in General Formula (3), $R_1$, $R_2$, and $R_3$ each independently represent any one of a hydrogen atom, an alkyl group having 1 to 18 carbon atoms, an aryl group, and an aralkyl group.

3. The recording medium according to claim 1,
wherein the structure represented by General Formula (1) is a structure represented by General Formula (4),

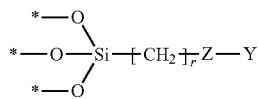
(4)

wherein the structure represented by General Formula (4) is bonded to the surface of the inorganic particle at positions marked with *, and
wherein, in General Formula (4),
Z represents any one of a single bond, an amide group, an ether group, a carbonyl group, and an ester group,
Y represents a structure including a primary hydroxyl group, and
r is an integer of 0 to 5.

4. The recording medium according to claim 1,
wherein the structure represented by Y in General Formula (1) includes a structure represented by General Formula (5),

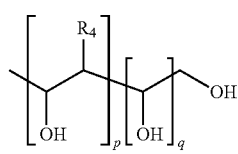
(5)

and wherein, in General Formula (5), $R_4$ represents any one of a hydrogen atom and a hydrocarbon group having 1 to 8 carbon atoms, and p+q is an integer of 1 or more.

5. The recording medium according to claim 1,
wherein the surface of the inorganic particle is modified with
a compound represented by General Formula (6), and
a compound represented by General Formula (7)

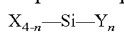
(6)

wherein, in General Formula (6),
X represents any one of an alkoxy group having 1 to 8 carbon atoms, an aryloxy group, and an acetoxy group,
Y represents a structure including a primary hydroxyl group, and
n is 1, 2, or 3,

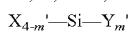
(7)

wherein, in General Formula (7),
X' represents any one of an alkoxy group having 1 to 8 carbon atoms, an aryloxy group, and an acetoxy group,
Y represents a structure including a cationic group, and
m is 1, 2, or 3.

6. The recording medium according to claim 1,
wherein the inorganic particle comprises a fumed silica particle.

7. The recording medium according to claim 1,
wherein the binder comprises polyvinyl alcohol.

* * * * *